Figure 1:
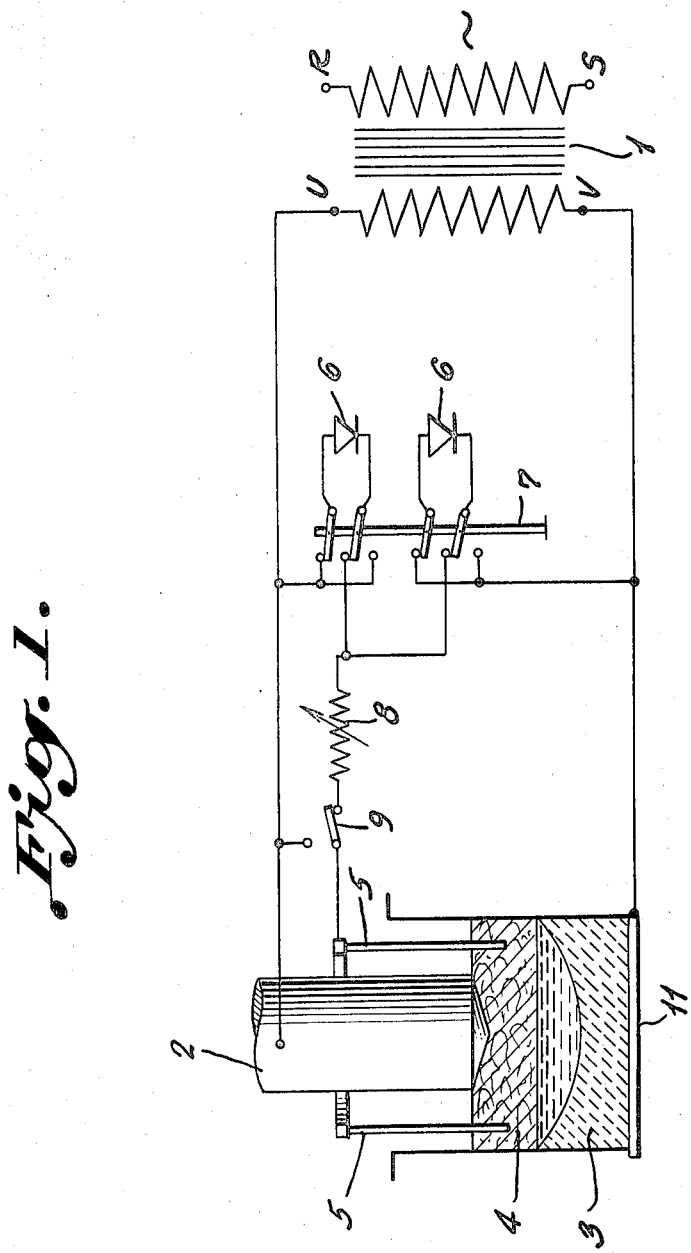

United States Patent

[11] 3,571,475

[72] Inventors Wolfgang Holzgruber
Peter Tunnergasse 16, A-8605 Kapfenberg;
Peter Machner, Mullgasse 7, A-8700
Leoben, Austria
[21] Appl. No. 676,094
[22] Filed Oct. 18, 1967
[45] Patented Mar. 16, 1971
[32] Priority Oct. 2, 1967
[33] Austria
[31] A-7290/67

[54] ELECTROSLAG REFINING APPARATUS
8 Claims, 2 Drawing Figs.

[52] U.S. Cl. .................................................. 13/9,
164/52
[51] Int. Cl. ............................................... H05b 7/18
[50] Field of Search ........................................... 164/52,
252; 13/9, 6, 18; 219/73; 75/10, 11; 314/69

[56] References Cited
UNITED STATES PATENTS
2,368,998  2/1945  Nissim ........................  13/9
3,439,103  4/1969  Holzgruber et al. ..........  13/9
2,370,467  2/1945  Hopkins ......................  164/52
2,448,886  9/1948  Hopkins ......................  13/9
2,783,411  2/1957  Matulaitus ..................  314/69
3,024,352  3/1962  Danhier ......................  219/126

FOREIGN PATENTS
979,583  1/1965  Great Britain ...............  164/52

*Primary Examiner*—Bernard A. Gilheany
*Assistant Examiner*—Roy N. Envall, Jr.
*Attorney*—Holman, Glascock, Downing & Seebold

ABSTRACT: High melting point solid metal is maintained immersed in an electrically conducting, electrolyzable slag and is melted to form and maintain a pool of molten metal under said slag. An auxiliary electrode is maintained immersed in said slag. Unidirectional electric current is conducted through said auxiliary electrode and through said slag to induce fusion electrolysis in said slag so as to control ionic chemical reactions in a predetermined polarity direction taking place in said slag.

Patented March 16, 1971 3,571,475

2 Sheets-Sheet 1

INVENTORS
WOLFGANG HOLZGRUBER
PETER MACHNER

BY *Blaustein, Downing + Seibold*

ATTORNEYS

ELECTROSLAG REFINING APPARATUS

It is known that in electric slag refining processes the composition of the slag is of great significance for the performance of metallurgical reactions taking place between the steel and slag. Such reactions include desulfurization, removal of oxygen and others. Thus, the composition of the slag may have a decisive influence on the final composition of the refined steel. The extent to which such reactions take place is limited by physicochemical and reaction-kinetical conditions. The slag may also be used to introduce various alloying elements into the steel. According to a copending U.S. Pat. application Ser. No. 676,036, sulfur may be added to the slag so that a certain desired sulfur content of the final product can be obtained under certain conditions. It has also been proposed to increase the nitrogen content of the steel by the use of slags which release nitrogen.

A major difficulty in the performance of these processes resides in that the composition of the slag during the remelting operation changes continually as a result of chemical reactions involving mainly the atmosphere which is in contact with the slag. In accordance therewith, the tendency of the slag to take up or release given elements is continually changed in dependence on the magnitude of the deviation from the equilibrium of distribution.

It is an object of the invention to enable a control of the slag composition and consequently of the interaction between the slag and the steel.

The invention is based on the fact that the slag is melted in the refining plant as a result of resistance heating occurring when an electric current flows through the slag and the slag becomes highly ionized. The inventive concept resides in that the chemical reactions between the slag and the steel, and between the slag and the atmosphere, are influenced in the desired sense by electromotive forces as electromotive forces are involved in these reactions.

The slag is highly ionized and the ions can be moved by a direct current flowing through the slag. The performance of metallurgical reactions between the steel and the slag can be influenced in this way. In all previous attempts to utilize this influence in the electric slag refining process, the consumable electrode was of opposite polarity to the ingot being formed in the mold. Hence, the fusible electrode was connected, e.g., as a cathode and the ingot as an anode, or vice versa. A true control of the performance of various processes is not possible with such circuit. This is clearly recognized if the principle of the process is recalled. The consumable electrode is immersed into the hot slag bath and is heated to the melting point. The drops of molten metal which are formed on the consumable electrode separate from the electrode and fall through the liquid slag and are collected in a molten pool on the ingot which is formed in the cooled mold. When direct current is used, the drops being formed are at one polarity (e.g., cathodic) when they are still on the consumable electrode. As a drop subsequently falls down, it assumes the opposite polarity (e.g., anodic). Any chemical reactions which are performed on the anode in a predetermined direction will be performed in the opposite direction on the cathode. As a result, a drop of molten steel is first, e.g., desulfurized and deoxidized on the consumable electrode by the action of the electric current, but when in the molten pool it picks up sulfur and oxygen from the slag. With opposite polarities, the steel would first pick up sulfur and oxygen from the consumable electrode and would release these two elements into the slag bath from the molten pool. In neither case can metallurgical processes be effectively controlled.

The present invention is based on the observation that the difficulties pointed out hereinbefore can be avoided if the consumable electrode and the ingot being formed are continuously held at the same polarity with respect to a nonconsumable electrode so that, e.g., the nonconsumable electrode acts as an anode and the consumable electrode and the ingot serve as a cathode. When utilizing the present invention it is possible, by the fusion electrolysis effect, to produce the undesired substances on the nonconsumable electrode and to avoid the transfer of desired metals or accompanying substances to the slag.

The present invention provides a process of making ingots of high-melting metals, particularly steel, by zone casting, in which at least one consumable electrode is fused down under the action of alternating current in an electrically conducting molten slag, and the invention resides in that fusion electrolysis is induced in the slag with the aid of at least one nonconsumable auxiliary electrode, which is immersed in the slag to control the direction of metallurgical reactions taking place in the slag.

Figure 2:
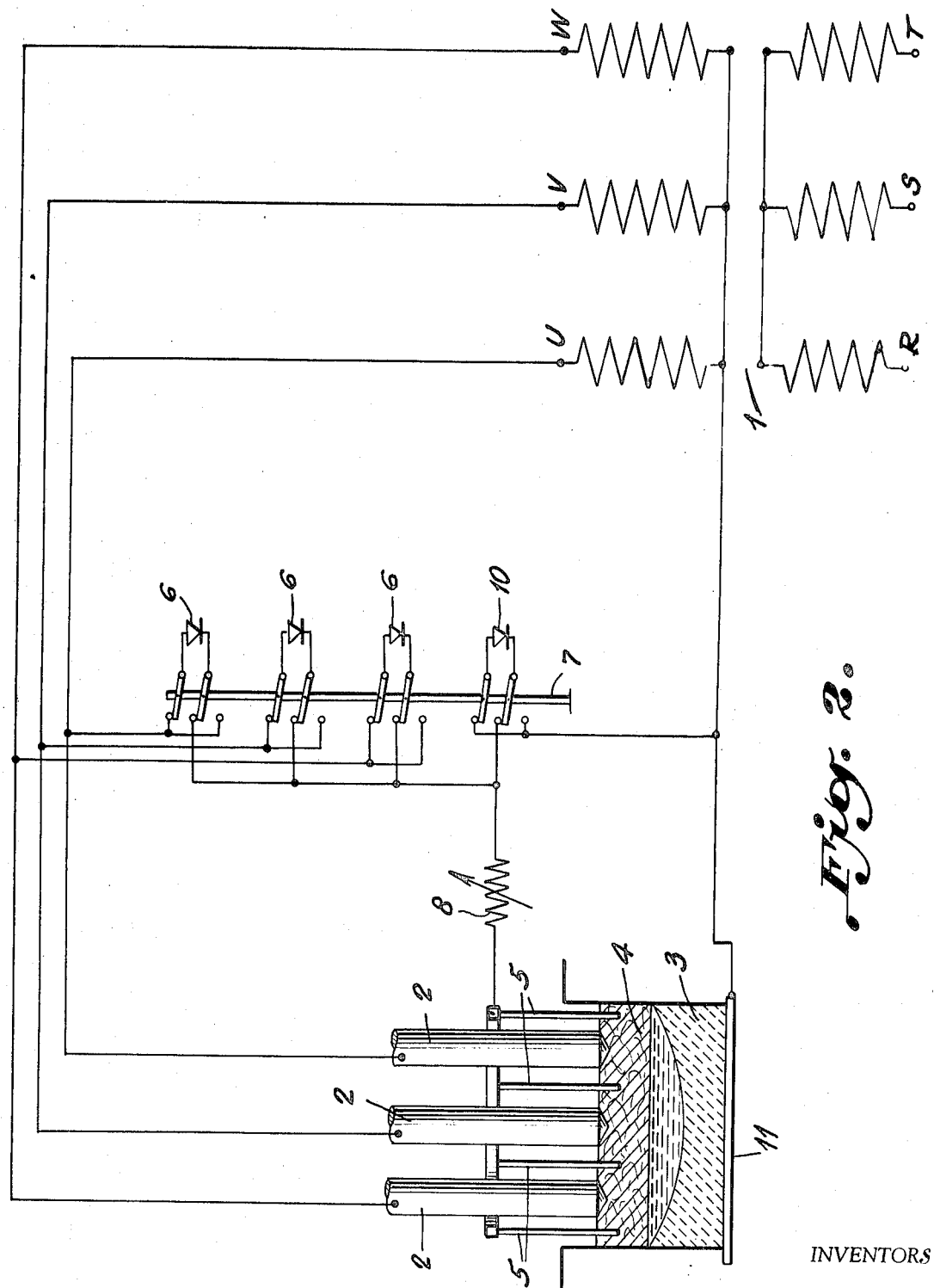

FIG. 1 schematically shows a single-phase electric slag refining installation according to the present invention; and FIG. 2 schematically shows a polyphase electric slag refining installation according to the present invention.

As an example of an application of the present invention, the promotion of the desulfurization and deoxidation will be explained more in detail first.

For this purpose, at least one nonconsumable electrode is required, which is immersed in the slag and is connected as an anode relative to the ingot and the consumable electrode. In this case, the consumable electrode and the bottom plate of the mold or the ingot being formed must be connected as a cathode. This arrangement results in the following reactions:

a. The sulfur S contained in the steel takes up two negative charges $2e^1$ from the cathode and is present in the slag as a negative ion $S^{11}$. The electromotive force exerted by the positive auxiliary electrode causes these $S^{11}$ ions to migrate to said auxiliary electrode so that the following reactions are obtained on the auxiliary electrode:

$$S^{11} \rightarrow S + 2e^1$$

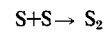
$$S + S \rightarrow S_2$$

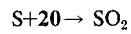
$$S + 2O \rightarrow SO_2$$

$SO_2$ and $S_2$, which is gaseous above 300° C., escape from the system at the anode.

b. The oxygen O in the steel takes up two negative charges from the cathode and is present in the slag as a negative ion $O^{11}$. The electromotive force of the positive auxiliary electrode causes these $O^1 1$ ions to move to the auxiliary electrode so that the following reactions take place on the auxiliary electrode:

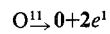
$$O^{11} \rightarrow O + 2e^1$$

$$O + O \rightarrow O_2$$

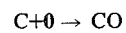
$$C + O \rightarrow CO$$

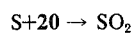
$$S + 2O \rightarrow SO_2$$

$O_2$, CO and $SO_2$ escape from the system as a gas at the anode. The rates of desulfurization and deoxidation will increase with the velocity of ion migration. The lower limit of the electromotive force $U_o$ which moves the ions can be calculated from the parameters $\Delta H$, $T$, $\Delta S$ and $n$ which are typical of the reactions which have been described.

$\Delta H$=heat quantity which is consumed or released during a given reaction, in cal./mole $\Delta S$=change of entropy during a chemical reaction in cal./deg.C. mole.

The values of $\Delta H$ and $\Delta S$ are known for various metallurgical reactions and can be obtained from the literature.

$T$=absolute temperature in deg. K.

$n$=number of elementary charges which are transferred per molecule or ion.

The expression $\Delta H - T \times F S \Delta G_o$ defines the free enthalpy of the standard reaction and corresponds to the work which is performed during a chemical process, $F$=Faraday's constant, which indicates the quantity of electric current required for $1/n$ mole (=1 Val)

$F = 96,500$ (coulomb) $= 26.6$ ampere-hour. The DC voltage $U$ required for an electrolytic treatment of the slag during electric slag refining is generally calculated by the equation $$U = U_o z J R$$

where $U_o \times$ theoretical electromotive force (e.m.f. or $E_o$) required to initiate the chemical process. This is calculated from
$\Delta G = G^o z R \times T \times \ln K^x \ x - n \times F \times U_o$
Hence $$U_o = \frac{R \times T}{n \times F} \times \ln K^x - \frac{\Delta G^o}{n \times P}$$

Besides $R = \frac{U}{J} = \frac{\rho \times 1}{f}$ ohm where $\zeta \times$ resistivity of the slag bath in ohm-centimeters
$l =$ distance between electrodes in the slag in centimeters
$f =$ electrode surface area in square centimeters.

An example will now be discussed. With the aid of the above expressions, the current and voltage will be calculated which are required for the discharge of sulfur and oxygen at certain rates.

Example

An ingot 300 mm. in diameter is remelted in an electric slag refining process at a melting rate of 200 kg./h. To remove sulfur and oxygen, direct current is superimposed in the slag bath and eight nonconsumable electrodes are used, each of which is 30 mm. in diameter. The slag has a resistivity of 0.5 ohm-centimeter. 0.010 percent oxygen and 0.020 percent sulfur are to be removed. The voltage and current required for this purpose will be calculated. The distance $l$ between the electrodes is 50 mm.

Required rate of oxygen removal; 0.010 percent of 200 kg./h. $= 20$ g./h.

Required rate of sulfur removal: 0.020 percent of 200 kg./h. $= 40$ g./h.

Current required for removal of oxygen
$\frac{20 \text{ g./h.}}{8 \text{ g.}} \times 26.6$ (ampere-hour) $= 66.5$ amperes Current required for removal of sulfur
$\frac{40 \text{ g./h.}}{16 \text{ g.}} \times 26.6$ (ampere-hour) $= 66.5$ amperes A constant total current of 123 amperes is thus required for removing sulfur and oxygen at the desired rates.
$\Delta G^o$ for oxygen $= 135,860 - 1.14 \times T$
at $1,600^\circ$ C., $\Delta G^o$ for oxygen $= 58,100$ cal./mole
$\Delta G^o$ for sulfur $= 162,520 + 5.27 \times BHT$
at C., $\Delta G^o$ for sulfur $= 52,600$ cal./mole
At low oxygen and sulfur concentrations, the expression $$\frac{R \times T}{n \times F} \times \ln K^x$$

becomes so small that it can be neglected in the present calculation. Then, at $1,600^\circ$ C.
$U_o$ for oxygen $=$ $$-\frac{-58,100 \text{ cal./mole} \times 4.2 \text{ Ws/cal.}}{2/\text{mole} \times 96,500 \text{ coulombs}} = 1.5 \text{ volts}$$

$U_o$ for sulfur $=$ $$-\frac{52,600 \text{ cal./mole} \times 4.2 \text{ Ws/cal.}}{2/\text{mole} \times 96,500 \text{ coulombs}} = 1.1 \text{ volts}$$

In these calculations, the factor 4.2 is used for a conversion of calories into watt-seconds (w.s.).

In this calculation, a higher $U_o$ was obtained for the oxygen so that this voltage must be used in the further calculations. From the above figures, the voltage $U$ which is required in the process can be calculated as $$U = U_o z R \times J$$
$$R = \frac{\rho \times 1}{f} = \frac{0.5 \times 5}{56}$$

$R = 0.045$ ohms
$U = 1.3 + 123 \times 0.045$
$U = 1.3 + 5.5 \quad 6.8$ volts

This shows that under the remelting conditions described above a DC voltage of at least 6.8 volts and a current of 123 amperes are required to remove 0.020 percent S and 0.010 percent 0 from the steel.

The application of the invention is obviously not restricted to sulfur or oxygen. Ionic reactions of all kinds can be controlled by electromotive forces as described above. Such reactions include, e.g., the removal of hydrogen from the steel if the hydrogen is present in the slag as OH'ion.

On the other hand, when free-cutting steels are remelted and a transfer of sulfur from the steel into the slag or a chemical reaction of the sulfur with the slag is to be prevented, the nonconsumable electrode must be connected as a cathode whereas the consumable electrode and the mold bottom plate constitute the anode. The resulting electromotive forces oppose the electromotive forces which would promote an undesired removal of sulfur. The minimum voltage $U_o$ required for this purpose is also calculated from the relation $$E \geq \frac{\Delta H - T \Delta S}{nF} \text{ (volts)}$$

The nonconsumable electrodes which are required in the process according to the invention and which are immersed in the slag may consist of metallic materials having melting points over $2,000^\circ$ C., such as molybdenum or tungsten. The auxiliary electrodes consist suitably of graphite.

The nonconsumable electrodes may be tubular and may concentrically surround the consumable electrode. Alternatively, uniformly spaced-apart nonconsumable electrode rods may be arranged with their axes on the surface of an imaginary cylinder which concentrically surrounds the consumable electrode. It will be understood that a plurality of consumable electrodes can be melted at the same time. The process according to the invention can be carried out in an AC-operated electric slag refining plant, in which nonconsumable auxiliary electrodes are arranged beside the consumable electrodes which are immersed in the slag. A DC voltage is applied between these nonconsumable electrodes and the ingot and/or the consumable electrode. An additional flow of direct current is thus produced in the slag and depending on the polarity, flows from or to the nonconsumable electrode system. The DC voltage may be obtained from DC sources or in an AC-operated remelting system from rectifiers.

FIG. 1 shows a single-phase electric slag-refining process according to the present invention. A single-phase transformer 1 has a secondary winding, which is connected at one terminal to the consumable electrode 2 to be fused down and at the other terminal to the bottom plate 11 of the mold and consequently to the ingot 3. This transformer supplies the energy which is required for the electric slag refining. The direction of current flow between the ingot and the consumable electrode is automatically reversed at the frequency of the supply system. Nonconsumable auxiliary electrodes 5 are immersed in the slag 4 and used to superimpose a direct current on this alternating current. This direct current may flow to or from the nonconsumable electrode system. The second pole of the direct current is connected to the consumable electrode, the ingot via the bottom plate, or both. The DC voltage is derived from rectifiers 6. To impart to the consumable electrode the proper polarity relative to the nonconsumable electrode, the terminal connected to the ingot is connected to the nonconsumable electrode system by a rectifier so that the positive or negative half-wave is effective, depending on the forward direction of the rectifier. The terminal connected to the consumable electrode is similarly connected to the nonconsumable electrode system. A switch 7 is provided for a reversal of the polarity of the auxiliary electrodes. A rheostat (variable resistor) 8 may be connected to control the value of the current flowing through the nonconsumable electrode. The current carried by the nonconsumable electrode results in a local temperature rise in the slag bath. This temperature rise may change the form of the molten metal pool on the ingot. The switch 9 serves for supplying alternating current to the auxiliary electrode system when this is required.

The current value may be controlled by the resistor 8 and by the position of the auxiliary electrode system 5 in the slag 4 relative to the ingot and consumable electrode. At a given distance of the consumable electrode to the ingot, the distance from the nonconsumable electrode to the consumable electrode and the ingot will determine the current flow through the nonconsumable electrode according to Faraday's laws. The ratio between the partial currents flowing from the nonconsumable electrode to the consumable electrode and to the ingot can be determined by selecting the distances from the nonconsumable electrodes to the consumable electrodes and to the ingot.

FIG. 2 shows how the nonconsumable electrodes can be connected in a polyphase electric slag-refining process. The secondary phase windings of the transformer 1 which are connected to the consumable electrodes are connected by rectifiers 6 to a nonconsumable electrode system 5. If the polyphase remelting plant is connected in star, another rectifier 10 may be connected between the neutral point and the nonconsumable electrode. A changeover switch 7 serves for reversing the polarity of the nonconsumable electrodes. The current through the nonconsumable electrodes is controlled by the position of the nonconsumable electrodes in the slag and by the rheostat 8.

Although the invention has been disclosed and illustrated in detail, it is to be understood that this does not delimit the invention. The spirit and scope of this invention is limited only by the language of the appended claims.

We claim:

1. An electroslag refining apparatus, which comprises: a liquid cooled ingot mold which has an open top, an electrically conducting bottom element and contains slag in electrical contact with said bottom element; at least one consumable electrode of metal extending below the upper level of said slag; at least one nonconsumable electrode extending into said ingot mold below the upper level of said slag; at least one alternating current source operatively connected between said consumable electrode and said bottom element and they are maintained at a first polarity relative to said nonconsumable electrode; and at least one direct current source, one pole of which is operatively connected to said nonconsumable electrode to maintain it at a second polarity, and the other pole of said direct current source is connected to said bottom element and to said consumable electrode.

2. An electroslag refining apparatus as claimed in claim 1 wherein said direct current source comprises at least one rectifier means connected between two leads from said alternating current source respectively connected to said consumable electrode and to said bottom element.

3. An electroslag refining apparatus as claimed in claim 1 wherein said nonconsumable electrode is made of a material having a higher melting point than that of the metal of said consumable electrode.

4. An electroslag refining apparatus as claimed in claim 1 wherein said alternating current source comprises at least one single-phase transformer having at least one secondary winding which is connected between said consumable electrode and said bottom element.

5. An electroslag refining apparatus as claimed in claim 1 which further comprises at least one switch means operatively connected to said direct current source to control the polarity of said nonconsumable electrode; and the metal of said consumable electrode is steel.

6. An electroslag refining apparatus as claimed in claim 1 which further comprises at least one variable resistor connected in series with said nonconsumable electrode and said direct current source to control the value of the current flowing to said nonconsumable electrode.

7. An electroslag refining apparatus as claimed in claim 1 wherein said consumable electrode comprises a plurality of metal consumable electrodes and said alternating current source comprises a polyphase transformer having a plurality of secondary phase windings, each of said secondary phase windings being connected at one terminal to one of said plurality of consumable electrodes and all of the other terminals of each said secondary windings being connected to said bottom element; and said direct current source being a plurality of rectifier means each connected in parallel respectively between said one terminal and said other terminals of the secondary windings and thereby constituting a plurality of direct current sources, there also being a plurality of nonconsumable electrodes and one pole of each direct current source is connected to the nonconsumable electrodes to maintain them at said second polarity, and the other pole of each direct current source is connected to each of said consumable electrodes and said bottom element so as to maintain them at said first polarity.

8. An electroslag refining apparatus as set forth in claim 7 wherein an additional rectifier means is connected between said bottom element and said nonconsumable electrodes.